United States Patent
Biggs et al.

(10) Patent No.: US 11,687,547 B1
(45) Date of Patent: Jun. 27, 2023

(54) SYSTEM AND METHODS FOR AN AUTOMATED CORE DUMP TO A JAVA HEAP DUMP CONVERSION

(71) Applicant: T-MOBILE INNOVATIONS LLC, Overland Park, KS (US)

(72) Inventors: Eric Biggs, Osawatomie, KS (US); James Saunders, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 429 days.

(21) Appl. No.: 17/076,570

(22) Filed: Oct. 21, 2020

(51) Int. Cl.
*G06F 11/36* (2006.01)
*G06F 16/25* (2019.01)
*H04L 67/1097* (2022.01)
*G06F 9/4401* (2018.01)

(52) U.S. Cl.
CPC .......... *G06F 16/254* (2019.01); *G06F 9/4401* (2013.01); *H04L 67/1097* (2013.01)

(58) Field of Classification Search
CPC ..................................................... G06F 11/362
See application file for complete search history.

(56) References Cited

U.S. PATENT DOCUMENTS

| | | | | |
|---|---|---|---|---|
| 7,243,338 B2* | 7/2007 | Sethi | ............... | G06F 11/0769 |
| | | | | 714/E11.21 |
| 11,226,755 B1* | 1/2022 | Douglass | ............... | G06F 3/0659 |
| 2008/0270839 A1* | 10/2008 | Ho | ............... | G06F 11/0715 |
| | | | | 714/38.11 |
| 2009/0172409 A1* | 7/2009 | Bullis | ............... | G06F 21/554 |
| | | | | 714/38.11 |
| 2018/0203753 A1* | 7/2018 | Chamberlain | ....... | G06F 11/073 |

* cited by examiner

*Primary Examiner* — Jae U Jeon

(57) ABSTRACT

A system for a heap dump conversion comprises a network storage device comprising a core dump file, a first server coupled to the network storage device, and a second server coupled to the network storage device and to the first server, where the second server receives a notification associated with the core dump file, obtains metadata information from the core dump file in response to receiving the notification, autonomously converts the core dump file into a heap dump file using the metadata information, and stores the heap dump file in the network storage device.

23 Claims, 3 Drawing Sheets

SYSTEM AND METHODS FOR AN AUTOMATED CORE DUMP TO A JAVA HEAP DUMP CONVERSION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A Java Virtual Machine (JVM) may execute Java applications or programs on any operating system (OS) of a machine, for example, on a server. During execution, the JVM manages and optimizes heap memory as a Java heap while the Java program is executed on the server. At times while the Java program is running a workload (also referred to as a Java process), the Java program may become unstable or unresponsive. For instance, a memory leak during execution may cause the Java program to have out of memory errors, causing the Java program to execute slowly or crash.

A conventional solution is to acquire a Java heap dump file for the non-responsive Java process using a Java utility program in a Java Application Programming Interface (API). The Java heap dump file is a snapshot of all live objects that were in use by a running Java program on the Java heap when the error occurred. After the Java heap dump file is acquired, the unresponsive Java process is removed from service by restarting the Java program. Restarting the Java program causes an undesired "down time" of the Java program while the Java program is restarting. Additionally, generating a heap dump file of the Java process may cause the Java utility to use considerable hardware resources of a machine (for example a server) while creating the heap dump file. During the process of creating a heap dump file, these hardware resources may be unavailable to other Java programs that may need to be executed, which further causes an extended "downtime" of other Java programs. The aforementioned solution is also an issue in cases where the restarted Java program and/or other Java programs operate in a "production" or "live" system, where downtime must be minimized so that an acceptable level of performance is maintained.

SUMMARY

In an embodiment, a system for a heap dump conversion is disclosed. The system comprises a network storage device comprising a core dump file, a first server coupled to the network storage device, and a second server coupled to the network storage device and to the first server. The second server is configured to receive a notification associated with the core dump file, obtain metadata information from the core dump file in response to receiving the notification, autonomously convert the core dump file into a heap dump file using the metadata information, and store the heap dump file in the network storage device.

In another embodiment, a method for a heap dump conversion implemented by a second server is disclosed. The method comprises receiving a notification instruction associated with a core dump file in a network storage by a watcher application executing on the second server, obtaining metadata information from the core dump file in response to receiving the notification instruction, wherein the metadata information is obtained by a converter application executing on the second server, autonomously converting the core dump file into a heap dump file using the metadata information by the converter application executing on the second server, and storing the heap dump file in the network storage by the converter application executing on the second server.

In yet another embodiment, a computer program product is disclosed. The computer program product comprises computer-executable instructions for storage on a non-transitory medium that, when executed by a processor, cause a computer system to receive a notification associated with a core dump file in a network storage, obtain metadata information from the core dump file in response to receiving the notification, autonomously convert the core dump file into a heap dump file using the metadata information, and store the heap dump file in the network storage.

In yet another embodiment, a method for a heap dump conversion is disclosed. The method comprises storing a core dump file in a network storage by a converter application executing on a first server, restarting a Java application by a restart application executing on the first server in response to storing the core dump file, receiving a notification instruction associated with the core dump file by a watcher application executing on a second server, obtaining metadata information from the core dump file in response to receiving the notification instruction, wherein the metadata information is obtained by a converter application executing on the second server, and autonomously converting the core dump file into a heap dump file using the metadata information by the converter application executing on the second server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
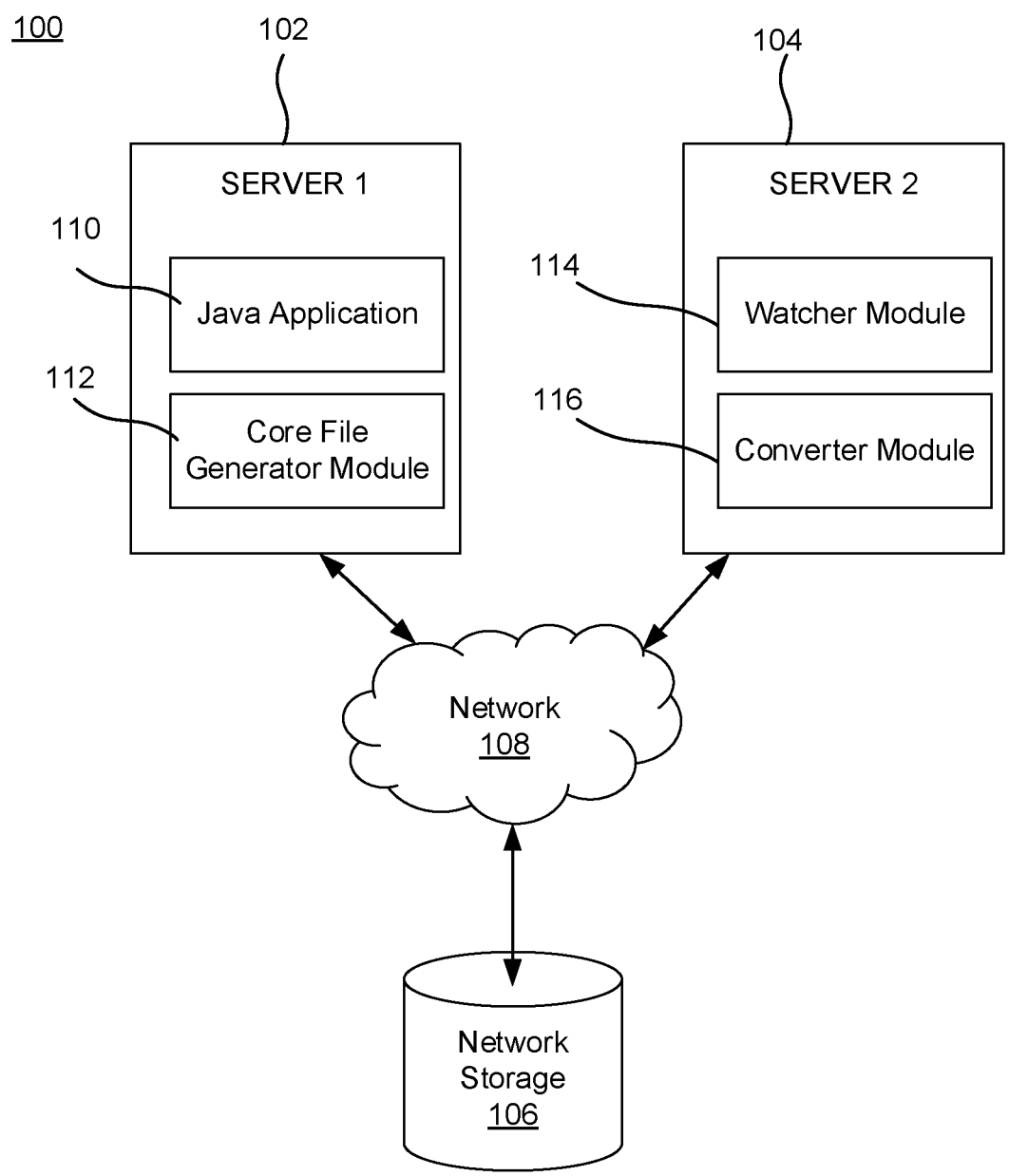
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

When a Java process become seriously impaired, first a Java heap dump of the process/computer may be taken using a Java memory map (JMAP) utility application/program of a Java Development Kit (JDK). Second, the Java process may be restarted (rebooted). However, while obtaining the Java heap dump, the JMAP utility may monopolize processor and memory resources on the subject computer (for example, a production computer) for an extended period of time (for example, as much as 5 hours). For instance, while creating the Java heap dump, hardware resources of the production computer may be unavailable to other Java processes that may need to be executed on the production load. This monopolization prevents the computer from carrying a production load while the Java heap dump is obtained.

To overcome this problem, an automated process for handling the management of diagnostic information may be implemented. First, the production computer may be coupled to a file system that is shared with a diagnostic computer. Second, when a Java process is impaired, a "generate a core file" (GCORE) command utility may be executed to take a core dump of the Java process/computer that is stored in the shared file system. In an embodiment, the GCORE command utility may be a system utility of a Linux OS, and interworks with Java. GCORE may not be part of the Java environment. The GCORE utility may acquire the core dump of the Java process/computer in a few minutes, after which the production computer can be rebooted, thereby putting the production computer back into service carrying a production load.

In an embodiment, an automated "watcher" process/module executing on the diagnostic computer may monitor the shared file system for the appearance of a new core dump file in the shared file system. On the event of finding a new core dump file, the "watcher" process may execute the JMAP utility application on the diagnostic computer. In an embodiment, the JMAP utility application converts the core dump file stored in the shared file system to a format (for example, a heap dump format) that is amenable to analysis. In an embodiment, after converting the core dump file, the JMAP utility application sends a notification to client computers that the diagnostics of a core dump are available. The JMAP utility application executing on the diagnostic computer may take as much as 5 hours to complete, but it is not impeding restarting of the production computer. In embodiments, as many as five production computers and a single diagnostic computer may be associated with the shared file system.

In an embodiment, a system may obtain core dump information of an abended or unresponsive Java application in a production server that is used for diagnosis in a diagnostic server while minimizing the downtime of the Java application in the production server. In an embodiment, the system may comprise a plurality of production servers and a single diagnostic server. On a production server, a core file generator module may obtain a core dump file comprising a core dump for one or more Java processes of a currently executing and abended Java application. The core dump file may include a snapshot of a recorded state of the memory and live objects for one or more Java processes at a specific time when the Java application abended or became unresponsive. The core dump file may further include metadata information comprising version information of the Java application. The core dump file is stored in a network storage that is coupled to each production server. In an embodiment, the network storage may be a network-attached computing device with non-volatile memory that may be configured with a network file system (NFS). Each production server may access a file system to read and write files and access directories in the file system over a computer network. The network storage 106 is coupled to the production server and the diagnostic server. The network storage may provide access to portions of memory that are designated accessible by the NFS of the network storage. For instance, a network administrator/user may instruct the NFS to mount (designate as accessible) all or a portion of a file system in the network storage to be accessible to the production server and the diagnostic server. The accessible portions of the file system may be readable and/or writable locations such as directories, folders, and/or files where the production server and diagnostic server access data. As such, the core dump file stored in the NFS may be accessible by any production server and the diagnostic server. After the core dump file is stored, the Java application is restarted to clear Java processes and resume using the Java application in the production server for processing workloads.

The system includes the diagnostic server. The diagnostic server is coupled to the network storage and includes read and/or write access to files and directories in network storage. The diagnostic server includes a watcher module and a converter module. The watcher module includes computer executable instructions that are configured to access the same file directories that are provisioned for the production server. Using the access, the watcher module may monitor the network storage to detect core dump files that have been written by the production server. In embodiments, the watcher module may be configured to autonomously search one or more directories in the network storage to detect new core dump files that have been written to the network storage. The watcher module may notify the converter module when it detects core dump files including their location in the network storage as these core dump files are detected on the network storage. In an embodiment, the unresponsive Java application is restarted after the core dump file is stored to the network storage.

The converter module is also coupled to the network storage. In an embodiment, the converter module includes computer executable instructions that are configured to autonomously convert the core dump file in the network storage into useable data for a Java application when a notification, a notification instruction, or other message is received from the watcher module. The converter module may access the same file directories that are provisioned for the production server in order to obtain the core dump file. In an embodiment, the converter module may autonomously convert the core dump file into a Java heap dump file after the notification or notification instruction is received. In an embodiment, the converter module may use the metadata information in the core dump file to interpret the core dump file prior to conversion into a Java heap dump file. In an embodiment, the metadata information may be Java version information of the Java application from which the core dump file was created.

The system taught herein minimizes the downtime to a production server so that an acceptable level of performance is maintained to the production server. The system taught herein minimizes the impact of obtaining a core dump of a Java application on a production server that has abended or become unresponsive. The system taught herein provides an effective combination of implementing command utilities in separate production and diagnostic servers/computers using an automated process of acquiring a core dump and a heap dump to resolve a real problem and significantly improve uptime performance while still working to diagnose and address underlying issues. Obtaining the core dump file on the production server and converting the core dump file on the diagnostic server for off-site analysis makes the hardware resources of the production server available for Java applications in the production environment. Further, restarting the abended Java application after obtaining the core dump file makes the Java application available for production workloads and prevents the production server from being unavailable for long periods of time while the core dump file is analyzed, thereby minimizing the downtime of the production server and maintain an acceptable level of performance.

Turning now to FIG. 1, a system 100 is described. In an embodiment, the system 100 may be configured to obtain core dump information of an unresponsive Java application in a production environment for diagnosis while minimizing the downtime of the Java application in the production environment. The system 100 comprises a production server 102, a diagnostic server 104, and a network storage 106. The production server 102 and the diagnostic server 104 are communicatively coupled to the network storage 106 over network 108. Although FIG. 1 depicts a single production server 102, it is to be appreciated that a plurality of production servers that are substantially similar to the production server 102 may be coupled to the single diagnostic server 104 and the network 108. The production server 102 and the diagnostic server 104 may be implemented as computer systems. Computer systems are described further hereinafter. The network 108 may be one or more private networks, one or more public networks, or a combination thereof. Network 108 may couple the production server 102 and the diagnostic server 104 to the network storage 106 using wired links, wireless links, or wired or wireless interfaces, or a combination thereof.

The production server 102 is a computer system or computing apparatus that may be configured for the production environment. In an embodiment, production server 102 includes a Java application 110 and a core file generator module 112. The Java application 110 may be part of a Java application platform that includes software instructions for execution by a processor and hardware on an operating system (OS) of the production server 102 for processing workloads on the production server 102. In an embodiment, the OS of the production server 102 may be a Linux OS. In embodiments, other OS's such as Microsoft® OS, Mac® OS, or Unix® may also be contemplated for use with the present disclosure.

The core file generator module 112 is coupled to the Java application 110. The core file generator module 112 may be a utility program of the operating system (OS) of the production server 102. For instance, the core file generator module 112 may be a Linux OS utility program. The core file generator module 112 may include computer executable instructions that are configured to obtain a core dump file having a core dump for one or more Java processes. The core dump file may be obtained for one or more Java processes when the Java application 110 abends or becomes unresponsive. The core dump file may be stored with a process identifier file extension of "pid". In an embodiment, a user may run a command utility, for example, run a "generate a core file" (GCORE) command utility to manually generate a core dump file of the Java application 110. The user may select the GCORE command utility when the Java process has crashed/abended or has slowed down while processing a workload on production server 102. The core dump file may include a snapshot of a recorded state of the memory and live objects used by the Java application 110 at a specific time when the Java application 110 abended or became unresponsive.

The core file generator module 112 may also store Java version information of the Java application 110 from which the core dump file was created. For instance, the core file generator module 112 may store the Java version information as metadata information in the core dump file. In an embodiment, the core dump file may be generated for any currently running or executing process of the Java application 110 or may be generated when an exception or error is detected for a currently executing process of the Java application 110. The core file generator module 112 may save the core dump file as a shareable file to a predetermined or predefined storage location such as, for instance, to a file system in the network storage 106, which will be described below.

The network storage 106 is coupled to the production server 102 and the diagnostic server 104. In an embodiment, the network storage 106 is a network-attached computing device with non-volatile memory that may be configured with a network file system (NFS). In embodiments, the network storage 106 may include flash memory, read-only memory (ROM), random access memory (RAM), or a magnetic computer storage device such as, for example a hard disk drive or a magnetic tape. The network storage 106 may provide access to portions of memory that are designated accessible by the NFS of the network storage 106. For instance, a network administrator/user may instruct the NFS to mount (designate as accessible) all or a portion of a file system in the network storage 106 to be accessible to the production server 102 and the diagnostic server 104. The accessible portions of the file system may be readable and/or writable locations such as directories, folders, and/or files where the production server 102 and diagnostic server 104 access data. For instance, the core file generator module 112 on the production server 102 may write the core dump file to the portion of the file system that is accessible by both the production server 102 and the diagnostic server 104. Further, the watcher module 114 may include computer executable instructions that monitor the accessible portions of the file system for the core dump file. Also, the converter module 116 on the production server 102 may include computer executable instructions that retrieve the core dump file from the accessible portions of the file system for conversion into a Java heap dump file. The production server 102 and the diagnostic server 104 may read and write files and access directories in the NFS over the network 108.

Also shown in FIG. 1, system 100 comprises a diagnostic server 104 that may be a computer system or computing apparatus that may be configured for an off-line diagnostic environment. In an embodiment, diagnostic server 104 may be configured with a Linux OS but other OS's such as Microsoft® OS, Mac® OS, or Unix® may also be contemplated for use with the present disclosure. As shown, the diagnostic server 104 comprises the watcher module 114 communicatively coupled to the converter module 116. Watcher module 114 may be coupled to the network storage 106 and includes read and/or write access to files and directories in network storage 106. The watcher module 114 is configured to access the same file systems that are provisioned for the production server 102. Accordingly, the watcher module 114 may access the file directories in the network storage 106 for detecting core dump files that have been written by the production server 102. In embodiments, watcher module 114 may be configured to autonomously search one or more directories in network storage 106 to detect new core dump files that have been written to network storage 106. In a Linux implementation, the watcher module 114 may be a search command utility program that searches file directories on network storage 106 for core dump file that have been migrated by the core file generator module 112. In an embodiment, the core dump file may be searched using a search term with a file name having a "pid" extension. The watcher module 114 may notify the converter module 116 of core dump files and their location in network storage 106 when these core dump files are detected on the network storage 106. In an embodiment, the unresponsive Java application 110 may be restarted after the core dump file is stored to the network storage so that it can be put back in service in the production environment. In embodiments, a restart command utility program (also referred to a restart application) may manually receive an instruction from a user or may automatically receive a restart instruction from the watcher module 114 after the watcher module 114 detects the core dump file. In an embodiment, restarting the Java application 110 may include restarting a JVM that was executing the Java application 110.

The converter module 116 is communicatively coupled to the network storage 106. In an embodiment, the converter module 116 may be a Java program or application. In an embodiment, the converter module 116 is configured to autonomously convert the core dump file in the network storage 106 into useable data that a Java application may use for diagnosis. The converter module 116 may autonomously convert the core dump file when the notification or notification instruction is received from the watcher module 114. The converter module 116 is configured with access permissions to access a file system with access permissions that are provisioned for the production server 102 and the diagnostic server 104. In an embodiment, the network storage 106 may be provisioned with an NFS that provides the production server 102 and the diagnostic server to access a file system, as discussed above. Accordingly, the converter module 116 may access the core dump file that was created by the core file generator module 112 in the network storage 106. In an embodiment, the converter module 116 autonomously converts the core dump file into a Java heap dump file after the notification or notification instruction is received. In an embodiment, converter module 116 may be implemented as a Java memory map (jmap) application that is used to convert the core dump file into a Java heap dump file. For instance, the core dump file, which is a Linux based file, is converted by the converter module 116 into a Java based file (for example, a heap dump file) that may be accessible off-site by a Java analysis application such as, for example, by a Java heap dump analysis application of the diagnostic server 104. In an embodiment, the converter module 116 may also be configured as a Java analysis application that interprets the heap dump file that was created from the core dump file. The heap dump file includes memory information of a Java process or list of processes and all live objects that are used by the running Java application 110. In an embodiment, the converter module 116 may use metadata in the core dump file to interpret the core dump file prior to conversion into a Java heap dump file. In an embodiment, the metadata information may be Java version information of the Java application 110 from which the core dump file was created. Using the version information of the Java application 110, the converter module 116 generates a Java heap dump file with a Java version that matches the version information of the Java application 110. In an embodiment, the core dump file may be deleted once the converter module 116 converts it into a java heap dump file.

Network storage 106 may be a distributed file system. In an embodiment, the distributed file system may be configured as a network file system (NFS), where read and write access is shared between the production server 102 and the diagnostic server 104. Access to the production server 102 and to the diagnostic server 104 is provided over the network 108. In an embodiment, the watcher module 114 and the converter module 116 may be configured to access the files and directories in the network storage 106 based on parameters that are predefined in order to view and interact with files stored therein. In an embodiment, the production server 102 may provide read and/or write access to all files within the network storage 106. Using the provided access, the watcher module 114 may monitor core dump files that are created by the core file generator module 112.

Figure 2:
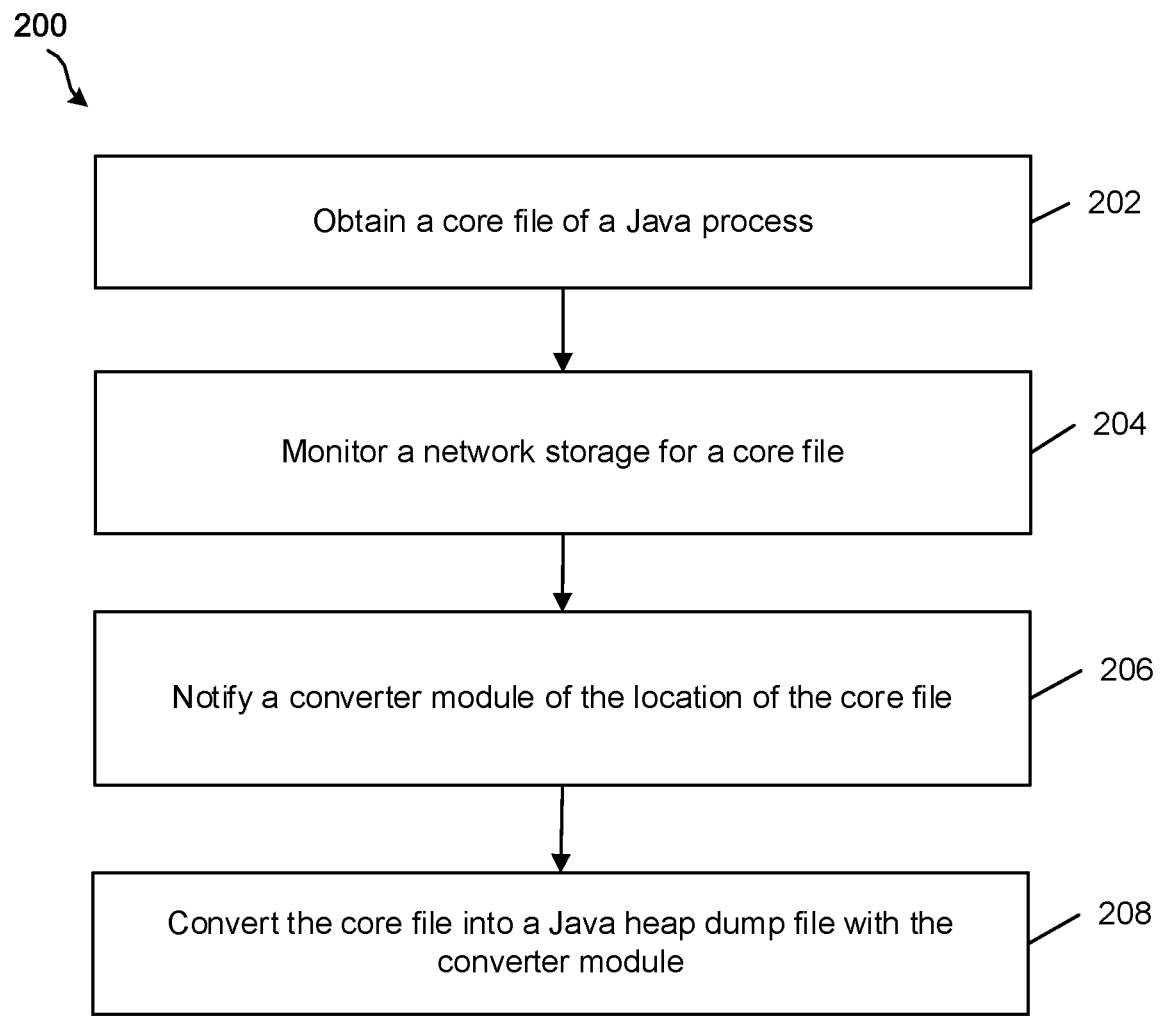
FIG. 2 is a flow chart of a method according to an embodiment of the disclosure.

Turning now to FIG. 2, a method 200 is described. In an embodiment, the method 200 is a method to obtain core dump information of an unresponsive Java application in a production environment for diagnosis while minimizing the downtime of the Java application in the production environment. At block 202, the method 200 comprises obtaining a core dump file of a Java Application. In an embodiment, the Java application may be the Java application 110 which has become unresponsive or abended. The processing of block 202 may comprise identifying the unresponsive Java application based on memory errors or abending of the Java application during execution. In an embodiment, the processing of block 202 may comprise obtaining a core dump file having a core dump for one or more Java processes using a Linux command utility. The core dump file may be a snapshot of a recorded state of the memory used by the Java application at a specific time, generally when the program is unresponsive or otherwise abended. The core dump file may be saved to a network storage. In an embodiment, the network storage is network storage 106. In an embodiment, the unresponsive Java application is restarted after the core dump file is stored in the network storage.

At block 204, the method 200 comprises monitoring the network storage for a core dump file. The processing of block 204 may comprise a watcher module that monitors one or more directories in the network storage in order to detect new core dump files. The watcher module may be watcher module 114. In an embodiment, monitoring may include autonomously searching for core dump files in the network storage using a search term with a file name having a process identifier with a "pid" extension.

At block 206, the method 200 comprises notifying a converter module of the location of the core dump file. In an embodiment, the converter module is the converter module 116. The processing of block 206 may comprise notifying a converter module when core dump files are detected. In an embodiment, the notification may include providing a location of the core dump file in the network storage. In an embodiment, the processing of block 206 may comprise creating, by the watcher module, a notification, a notification instruction, or other message indicating that a core dump file has been generated and identifying the location of the core dump file and sending the notification, notification instruction, or message to the converter module.

At block 208, the method 200 comprises converting the core dump file in the network storage into a Java heap dump file. The processing of block 208 may comprise using the converter module to convert the core dump file into a Java heap dump file that is useable to a Java analysis application.

The conversion is autonomously performed by the converter module upon receiving the notification from the watcher module. In an embodiment, the converter module may use metadata in the core dump file to interpret the core dump file prior to conversion into the Java heap dump file. In an embodiment, the metadata information may be Java version information of a Java application from which the core dump file was created. In an embodiment, the core dump file may be deleted once the converter module 116 converts the core dump file into a java heap dump file.

Figure 3:
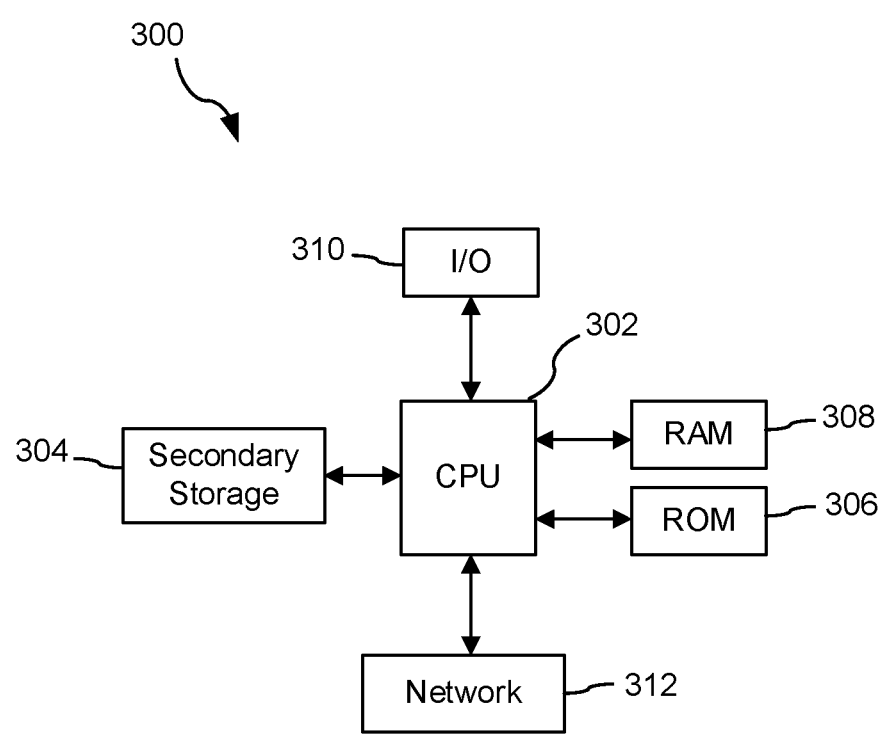
FIG. 3 is a block diagram of a computer system according to an embodiment of the disclosure.

FIG. 3 illustrates a computer system 300 suitable for implementing one or more embodiments disclosed herein. For example, in an embodiment, the production server 102 and the diagnostic server 104 described above may be implemented in a form similar to that of computer system 300. The computer system 300 includes a processor 302 (which may be referred to as a central processor unit or CPU) that is in communication with memory devices including secondary storage 304, read only memory (ROM) 306, random access memory (RAM) 308, input/output (I/O) devices 310, and network connectivity devices 312. The processor 302 may be implemented as one or more CPU chips.

It is understood that by programming and/or loading executable instructions onto the computer system 300, at least one of the CPU 302, the RAM 308, and the ROM 306 are changed, transforming the computer system 300 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 300 is turned on or booted, the CPU 302 may execute a computer program or application. For example, the CPU 302 may execute software or firmware stored in the ROM 306 or stored in the RAM 308. In some cases, on boot and/or when the application is initiated, the CPU 302 may copy the application or portions of the application from the secondary storage 304 to the RAM 308 or to memory space within the CPU 302 itself, and the CPU 302 may then execute instructions that the application is comprised of. In some cases, the CPU 302 may copy the application or portions of the application from memory accessed via the network connectivity devices 312 or via the I/O devices 310 to the RAM 308 or to memory space within the CPU 302, and the CPU 302 may then execute instructions that the application is comprised of. During execution, an application may load instructions into the CPU 302, for example load some of the instructions of the application into a cache of the CPU 302. In some contexts, an application that is executed may be said to configure the CPU 302 to do something, e.g., to configure the CPU 302 to perform the function or functions promoted by the subject application. When the CPU 302 is configured in this way by the application, the CPU 302 becomes a specific purpose computer or a specific purpose machine.

The secondary storage 304 is typically comprised of one or more disk drives or tape drives and is used for non-volatile storage of data and as an over-flow data storage device if RAM 308 is not large enough to hold all working data. Secondary storage 304 may be used to store programs which are loaded into RAM 308 when such programs are selected for execution. The ROM 306 is used to store instructions and perhaps data which are read during program execution. ROM 306 is a non-volatile memory device which typically has a small memory capacity relative to the larger memory capacity of secondary storage 304. The RAM 308 is used to store volatile data and perhaps to store instructions. Access to both ROM 306 and RAM 308 is typically faster than to secondary storage 304. The secondary storage 304, the RAM 308, and/or the ROM 306 may be referred to in some contexts as computer readable storage media and/or non-transitory computer readable media.

I/O devices 310 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 312 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 312 may provide wired communication links and/or wireless communication links (e.g., a first network connectivity device 312 may provide a wired communication link and a second network connectivity device 312 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 312 may enable the processor 302 to communicate with the Internet or one or more intranets. With such a network connection, it is contemplated that the processor 302 might receive information from the network, or might output information to the network in the course of performing the above-described method steps. Such information, which is often represented as a sequence of instructions to be executed using processor 302, may be received from and outputted to the network, for example, in the form of a computer data signal embodied in a carrier wave.

Such information, which may include data or instructions to be executed using processor 302 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 302 executes instructions, codes, computer programs, scripts which it accesses from hard disk, floppy disk, optical disk (these various disk based systems may all be considered secondary storage 304), flash drive, ROM 306, RAM 308, or the network connectivity devices 312. While only one processor 302 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 304, for example, hard drives, floppy disks, optical disks, and/or other device, the ROM 306, and/or the RAM 308 may be referred to in some contexts as non-transitory instructions and/or non-transitory information.

In an embodiment, the computer system 300 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 300 to provide the functionality of a number of servers that is not directly bound to the number of computers in the computer system 300. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 300, at least portions of the contents of the computer program product to the secondary storage 304, to the ROM 306, to the RAM 308, and/or to other non-volatile memory and volatile memory of the computer system 300. The processor 302 may process the executable instructions and/or data structures in part by directly accessing the computer program product, for example by reading from a CD-ROM disk inserted into a disk drive peripheral of the computer system 300. Alternatively, the processor 302 may process the executable instructions and/or data structures by remotely accessing the computer program product, for example by downloading the executable instructions and/or data structures from a remote server through the network connectivity devices 312. The computer program product may comprise instructions that promote the loading and/or copying of data, data structures, files, and/or executable instructions to the secondary storage 304, to the ROM 306, to the RAM 308, and/or to other non-volatile memory and volatile memory of the computer system 300.

In some contexts, the secondary storage 304, the ROM 306, and the RAM 308 may be referred to as a non-transitory computer readable medium or a computer readable storage media. A dynamic RAM embodiment of the RAM 308, likewise, may be referred to as a non-transitory computer readable medium in that while the dynamic RAM receives electrical power and is operated in accordance with its design, for example during a period of time during which the computer system 300 is turned on and operational, the dynamic RAM stores information that is written to it. Similarly, the processor 302 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for a heap dump conversion, comprising:
storing a core dump file in a network storage by a converter application executing on a first server;
restarting a Java application by a restart application executing on the first server in response to storing the core dump file;
receiving a notification instruction associated with the core dump file by a watcher application executing on a second server;
obtaining metadata information from the core dump file in response to receiving the notification instruction, wherein the metadata information is obtained by a converter application executing on the second server; and
autonomously converting the core dump file into a heap dump file using the metadata information by the converter application executing on the second server.

2. The method of claim 1, wherein the core dump file comprises a core dump of one or more Java processes of the Java application executing on the first server.

3. The method of claim 1, further comprising storing the heap dump file in the network storage by the converter application executing on the second server.

4. The method of claim 1, further comprising receiving the notification instruction by the converter application executing on the second server when detecting the core dump file in the network storage.

5. The method of claim 1, wherein the metadata information comprises version information of the Java application on the first server.

6. The method of claim 5, wherein the heap dump file comprises the same version information as the version information of the Java application.

7. The method of claim 1, further comprising monitoring the network storage to detect the core dump file by the watcher application executing on the second server.

8. A system for a heap dump conversion, comprising:
a network storage device comprising a core dump file;
a first server coupled to the network storage device; and
a second server coupled to the network storage device and to the first server, wherein the second server is configured to:
receive a notification associated with the core dump file;
obtain metadata information from the core dump file in response to receiving the notification;
autonomously convert the core dump file into a heap dump file using the metadata information; and
store the heap dump file in the network storage device.

9. The system of claim 8, wherein the core dump file comprises a core dump of one or more Java processes of a Java application executing on the first server.

10. The system of claim 9, wherein the first server is configured to:
store the core dump file in the network storage device; and
restart the Java application in response to storing the core dump file.

11. The system of claim 8, wherein the second server is configured to receive the notification when detecting the core dump file in the network storage device.

12. The system of claim 11, wherein the metadata information comprises version information of a Java application on the first server.

13. The system of claim 12, wherein the heap dump file comprises the same version information as the version information of the Java application.

14. The system of claim 8, wherein the first server and the second server are configured to access the same file directories in the network storage device.

15. The system of claim 8, wherein the second server is configured to monitor the network storage device to detect the core dump file.

16. A method for a heap dump conversion implemented by a second server, comprising:
receiving a notification instruction associated with a core dump file in a network storage by a watcher application executing on the second server;
obtaining metadata information from the core dump file in response to receiving the notification instruction, wherein the metadata information is obtained by a converter application executing on the second server;
autonomously converting the core dump file into a heap dump file using the metadata information by the converter application executing on the second server; and
storing the heap dump file in the network storage by the converter application executing on the second server.

17. The method of claim 16, wherein the core dump file comprises a core dump of one or more Java processes of a Java application that is executing on a first server.

18. The method of claim 17, further comprising:
storing the core dump file in the network storage by the converter application executing on the second server; and
restarting the Java application in response to storing the core dump file by a restart application executing on the second server.

19. The method of claim 16, further comprising receiving the notification instruction by the converter application executing on the second server when detecting the core dump file in the network storage.

20. The method of claim 19, wherein the metadata information comprises version information of a Java application on a first server.

21. The method of claim 20, wherein the heap dump file comprises the same version information as the version information of the Java application.

22. The method of claim 16, further comprising providing, to a first server and the second server, access permissions to the same file directories in the network storage by the network storage.

23. The method of claim 16, further comprising monitoring the network storage to detect the core dump file by the watcher application executing on the second server.

* * * * *